UNITED STATES PATENT OFFICE.

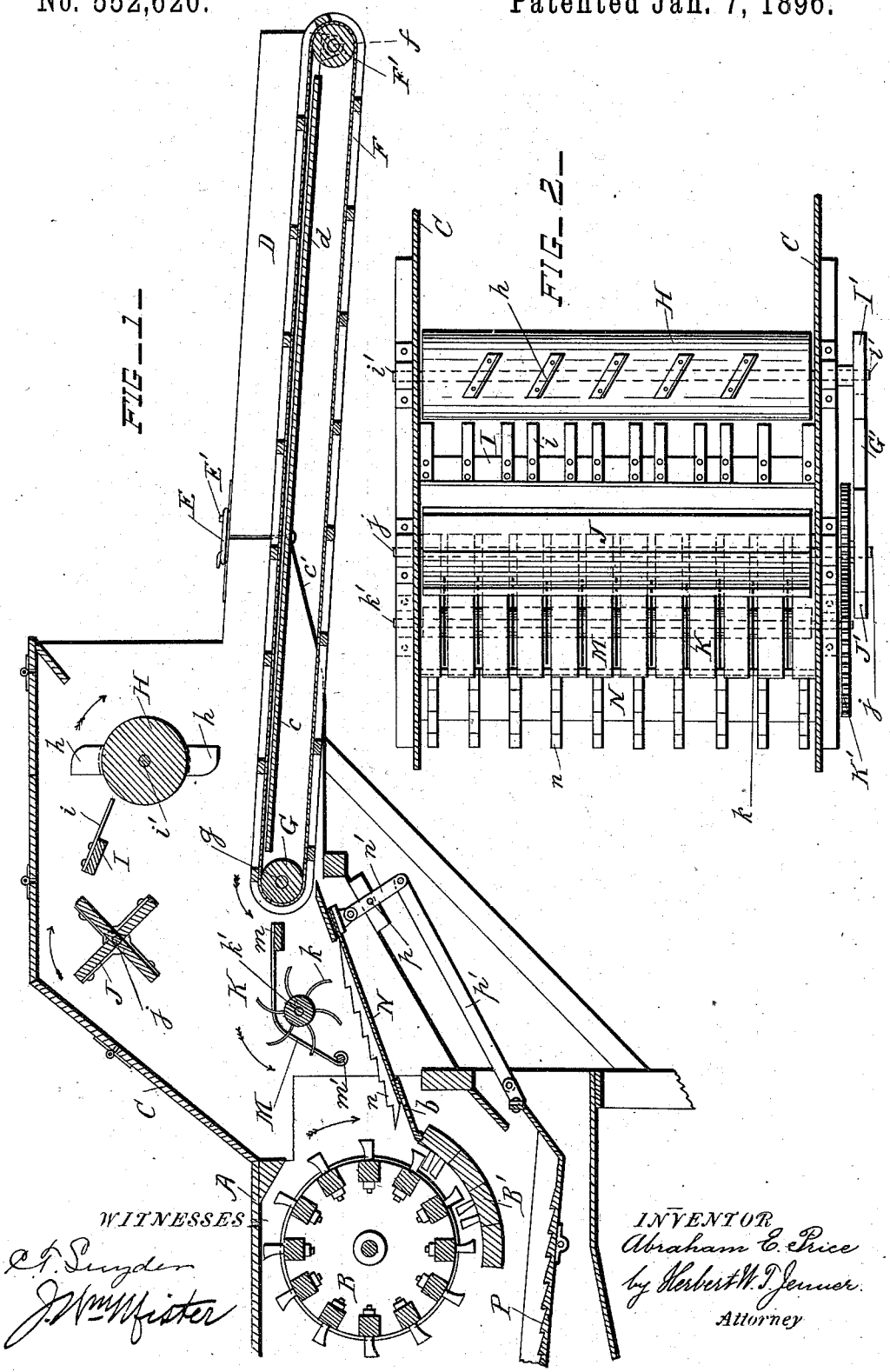

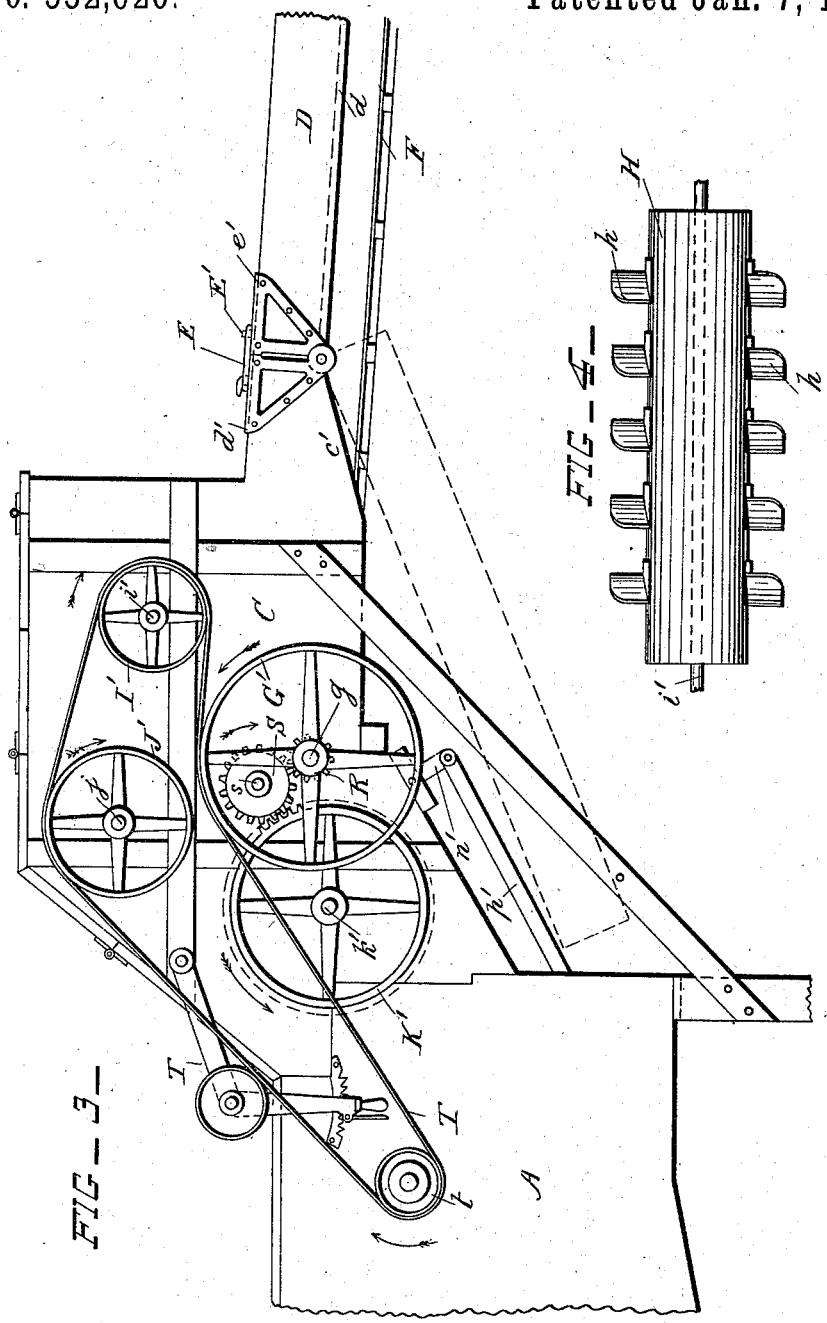

ABRAHAM E. PRICE, OF WAYNESBOROUGH, PENNSYLVANIA, ASSIGNOR TO THE GEISER MANUFACTURING COMPANY, OF SAME PLACE.

BAND-CUTTER AND FEEDER.

SPECIFICATION forming part of Letters Patent No. 552,620, dated January 7, 1896.

Application filed February 19, 1895. Serial No. 538,983. (No model.)

*To all whom it may concern:*

Be it known that I, ABRAHAM E. PRICE, a citizen of the United States, residing at Waynesborough, in the county of Franklin and State of Pennsylvania, have invented certain new and useful Improvements in Band-Cutters and Feeders; and I do hereby declare the following to be a full, clear, and exact description of the invention, such as will enable others skilled in the art to which it appertains to make and use the same.

This invention relates to band-cutters and feeders for use in connection with thrashing-machines; and it consists in the novel construction and combination of the parts and the method of feeding the unthrashed straw, as hereinafter fully described and claimed.

In the drawings, Figure 1 is a longitudinal section through the band-cutter and feeder. Fig. 2 is a plan view of the same. Fig. 3 is a side view showing the driving mechanism. Fig. 4 is a front view of the cutting-roller.

A is a portion of the casing of a thrashing-machine. B is the thrashing-cylinder, and B' is the concave. These parts may be of any approved construction.

C is the casing which incloses the band-cutter and feeder. This casing is secured to the casing A, and is provided at its front end with the board $c$ for supporting the upper part of the conveyer.

D is a trough provided with a bottom portion $d$ arranged in line with the board $c$ and also adapted to support the upper part of the conveyer. The trough D is pivoted to the casing C by means of the hinge-plates $d'$ and and $e'$. The hinge-pin is arranged at the bottom of the trough, and the sides of the casing C are inclined at $c'$, so that the trough together with the front part of the conveyer can be folded under the casing C when not in use, as indicated by the dotted lines in Fig. 3.

Links E are pivoted to the upper parts of the hinge-plates $d'$ and engage with projections E' on the hinge-plates $e'$ when the conveyer is in use, and operate to support the bottom of the conveyer in line with the board $c$.

F is the conveyer, which is of any approved construction.

F' is a roller journaled in bearings $f$ secured to the under side of the trough and carrying the front end of the conveyer. The rear end of the conveyer is carried and driven by the roller G arranged inside the casing C and journaled in bearings secured to its side plates.

G' is a belt-pulley for driving the conveyer, secured to the end of the shaft $g$ of the roller G, outside the casing.

H is a roller provided with knives $h$ for cutting the bands and spreading the sheaves. This roller is journaled over the rear part of the conveyer inside the casing C. Two straight rows of knives $h$ are provided and are arranged one on each side of the roller H, vacant places being left between the said rows. The knives of each row are radially straight, and are inclined laterally with reference to the direction of the motion of the grain on the conveyer. The knives in one row are inclined in one direction and the knives of the other row are inclined in the opposite direction. The conveyer is wide enough to receive several sheaves side by side, and the sheaves are thrown on the conveyer from each side without any care being taken to arrange them abreast of each other. If a single sheaf falls on the right-hand side of the conveyer and the first row of cutting-knives spreads it out to the left, the second row of cutting-knives does not touch it, but if the first row of knives piles it up to the right the second row catches its rear end and spreads it out to the left. Single sheaves falling successively on the center part of the conveyer are spread to the right and to the left alternately. When two or more sheaves are on the conveyer side by side and one somewhat behind the other, which is the usual working condition, the spreading to the right and to the left is averaged up, and the vacant spaces between the rows of knives prevent the same grain from being moved first to the right and then to the left too often, which would mix and tangle the grain.

I is a cross-piece secured in the casing behind the roller H, and $i$ are fingers secured to the cross-piece and projecting between the knives $h$ to prevent the straw from wrapping around the roller H.

I' is a belt-pulley secured on the shaft $i'$ of the roller H, outside the casing. The roller H is revolved at a high speed, so that the knives $h$ move considerably faster than the sheaves on the conveyer and in the same direction.

J is a beater consisting of four boards arranged in the form of a cross, and secured on a shaft $j$ which is journaled in the casing C behind the roller H and a little above the shaft $i'$.

J' is a belt-pulley secured on the end of the shaft $j$, outside the casing, and operating to revolve the beater J in the same direction as the roller H but not quite so fast.

The top part of the casing C is provided with hinged doors, so that access can be had to its interior whenever necessary.

K is the feed-regulator, consisting of a roller provided with curved teeth $k$. This roller is provided with a shaft $k'$ journaled in the casing C to the rear of the conveyer and a little below it. The feed-regulator is provided with a toothed wheel K' secured on its driving-shaft outside the casing, which operates to revolve it in the same direction as the conveyer but at a much slower speed.

M are plates arranged between the teeth of the feed-regulator for carrying the grain and preventing it from wrapping around the roller. The front ends of these plates are secured to the cross-piece $m$, and their rear ends are supported by the bar $m'$. A single plate provided with slots for the teeth $k$ to project through may be used, if desired, as the equivalent of the series of plates M.

The front ends of the plates M are substantially horizontal and a little below the level of the top of the conveyer, so that the ends of the teeth when uppermost are substantially on a level with the top of the conveyer. The middle portions of the plates M are curved concentric with the shaft $k'$, and their rear portions are inclined downwardly at an angle of about seventy degrees. The grain is fed horizontally by the conveyer, and when it passes over the retarder it pitches down suddenly and is fed to the cylinder at a tangent to its periphery, the upper part of the spread-out sheaf going first and the lower part later as permitted by the retarder.

The tangential feeding of the spread-out sheaf to the cylinder is assisted by the beater J, the arms of which strike the end portions of the sheaf and impel it forward and downward, the beater being located for this purpose over the front ends of the plates M and between the rear end of the conveyer and the retarder.

N is the grain-return board provided with serrated bars $n$. This board is reciprocated longitudinally, and is arranged in an inclined position under the feed-regulator K. The rear end of the board N rests on the feed-plate $b$ of the cylinder, and its front end is carried by rocker-arms $n'$. The arms $n'$ are pivoted on pins $p$, and may have their motion imparted to them by connecting-rods $p'$ pivoted to them and to the reciprocatory grain-pan P under the cylinder, or they may be operated in any other convenient manner.

A toothed pinion R is secured on the shaft $q$ of the conveyer, and S is a toothed idle-wheel journaled on the pin $s$ projecting from the casing. The wheel S gears into the pinion R and into the wheel K', and causes the feed-regulator to revolve in the same direction as the conveyer, but at a much slower speed.

T is the driving-belt. This belt passes around the driving-pulley $t$ secured on the cylinder-shaft, over the pulley J' on the beater-shaft, around the pulley I' of the band-cutter roller, and over the pulley G', which drives the conveyer.

T' is a belt-tightener of approved construction for regulating the tension of the belt T.

The operation of the device is as follows: The sheaves are thrown upon the conveyer and are carried by it under the band-cutter roller. The knives of the band-cutter roller cut the bands which hold the sheaves together and spread the unthrashed grain evenly and loosely upon the rear part of the conveyer, throwing it to the right and to the left alternately. The conveyer carries the grain rearward and the beater presses it downward and rearward. These two parts force the straw over the plates M and into the cylinder of the thrashing-machine in an even stream. The teeth of the feed-regulator retard the rearward motion of the lower stratum of grain on the plates M and permit the upper stratum to slide over the lower into the thrashing-cylinder. The heads are therefore fed gradually into the cylinder, and the heads of one sheaf are not fed into the cylinder all at one time. The retardation of the lower stratum of grain insures a very even and constant feed, as the upper stratum of grain continues its rearward movement without material retardation, and the parts which feed the grain to the thrashing-cylinder never slip in the grain and permit it to stop or to accumulate in bunches.

What I claim is—

1. In a band cutter and feeder, the combination, with a conveyer; of a roller arranged over the conveyer and provided with two rows of knives arranged one on each side of it, and vacant spaces between the rows, the knives in each row being radially straight and inclined laterally, and the knives in one row being inclined in one direction and those of the other row in the opposite direction, whereby a substantially even distribution of the grain of several sheaves is effected, substantially as set forth.

2. In a band cutter and feeder, the combination, with a conveyer; of a roller arranged over the conveyer and provided with two rows of knives arranged one on each side of it, and vacant spaces between the rows, all the knives in one row being inclined laterally in one direction and all the knives in the other row being inclined laterally in the opposite direction, substantially as set forth.

In testimony whereof I affix my signature in presence of two witnesses.

ABRAHAM E. PRICE.

Witnesses:
J. J. OLLER,
E. G. CLYMANS.